Jan. 8, 1952 B. CARTER 2,582,102
BARREL TRUCK
Filed April 20, 1950 2 SHEETS—SHEET 1
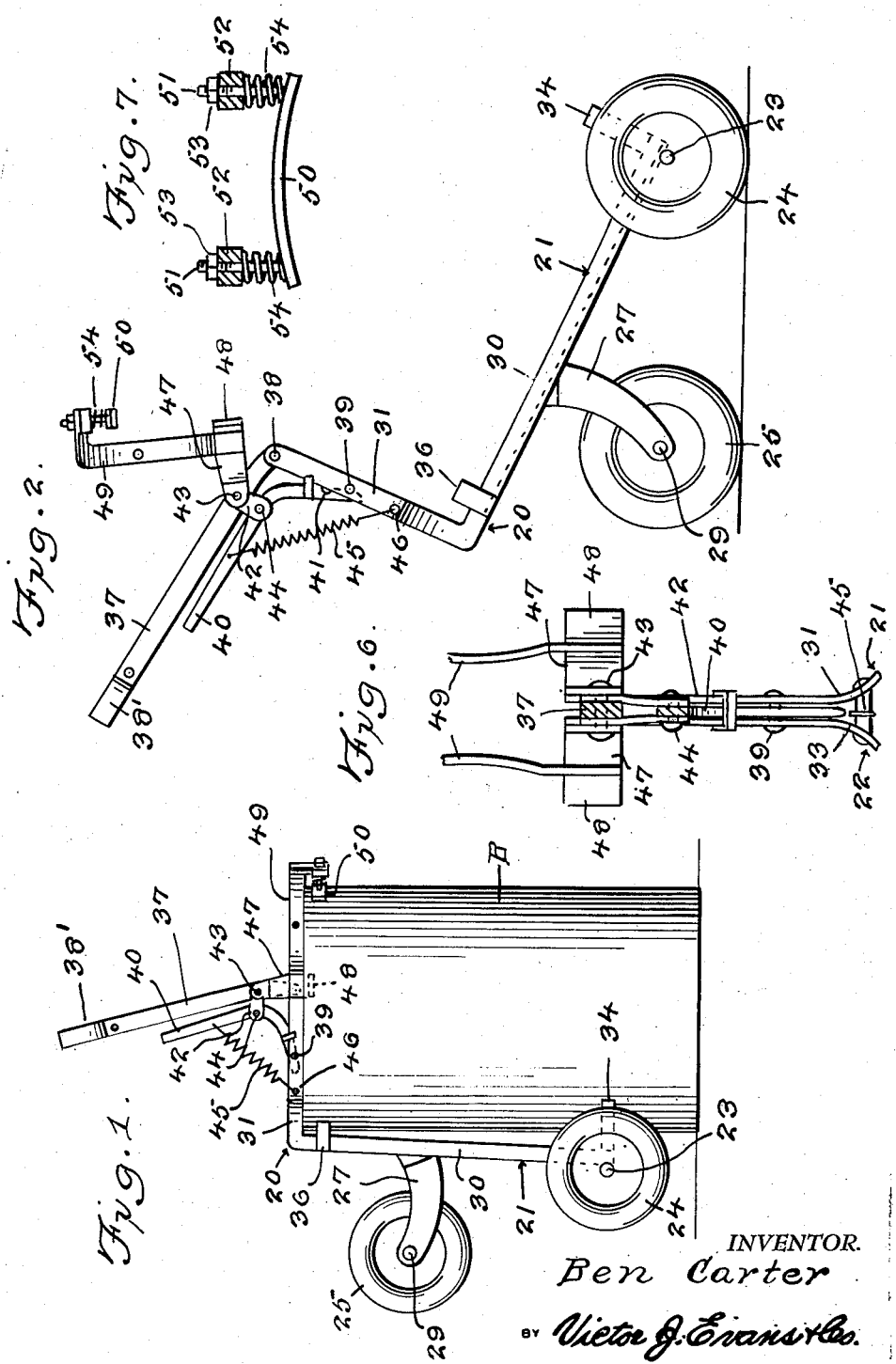
INVENTOR.
Ben Carter
BY Victor J. Evans & Co.
ATTORNEYS Jan. 8, 1952
B. CARTER
2,582,102
BARREL TRUCK
Filed April 20, 1950
2 SHEETS—SHEET 2
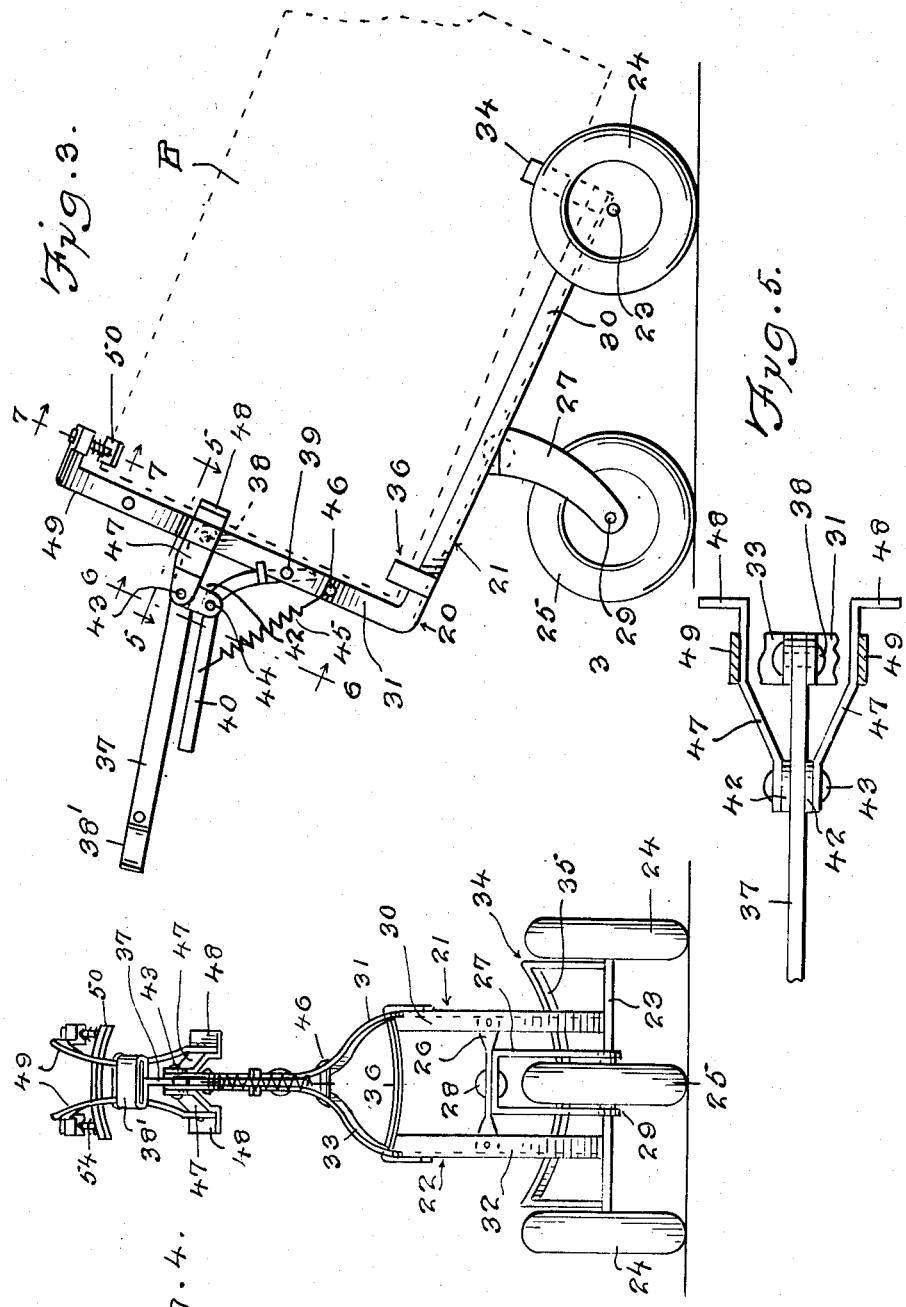
INVENTOR.
Ben Carter
BY Victor J. Evans & Co.
ATTORNEYS Patented Jan. 8, 1952

2,582,102

UNITED STATES PATENT OFFICE 2,582,102

BARREL TRUCK

Ben Carter, Keyesport, Ill., assignor of one-half to Edward Courtwright, Granite City, Ill.

Application April 20, 1950, Serial No. 157,166

2 Claims. (Cl. 214—65.4)

This invention relates to a truck, and more particularly to a truck that is adapted to be used for handling or transporting barrels or other large cylindrical containers.

The object of the invention is to provide a truck which can be readily and quickly engaged with or disengaged from a barrel so as to permit ready transportation and handling of the barrel.

Another object of the invention is to provide a truck that is adapted to be used for moving barrels from one place to another, and whereby the truck of the present invention includes a manually operable locking means for preventing accidental disengagement of the truck from the barrel.

A further object of the invention is to provide a barrel truck which is extremely simple and inexpensive to manufacture.

Other objects and advantages will be apparent during the course of the following description.

In the accompanying drawings forming a part of this application, and in which like numerals are used to designate like parts throughout the same:

Figure 1 is a side elevational view of the barrel truck of the present invention shown in locked position on a barrel to be moved;

Figure 2 is a side elevational view of the barrel truck showing the position of the parts in open position;

Figure 3 is a side elevational view of the barrel truck illustrating the position of the parts when the truck is supporting a barrel;

Figure 4 is a rear elevational view of the barrel truck;

Figure 5 is a sectional view taken on the line 5—5 of Figure 3;

Figure 6 is an enlarged sectional view taken on the line 6—6 of Figure 3;

Figure 7 is an enlarged sectional view taken on the line 7—7 of Figure 3.

Referring in detail to the drawings, the numeral 20 designates a frame which constitutes part of the truck of the present invention. This truck is adapted to be used for handling or transporting barrels B (broken lines) or other cylindrical containers which may be filled with any suitable material, such as petroleum products.

The frame 20 includes a pair of spaced, L-shaped body members 21 and 22 which may be fabricated of any suitable material, such as angle iron. Extending between the front ends of the body members 21 and 22 and connected thereto is a horizontally disposed axle 23. A pair of spaced, parallel, vertically disposed front wheels 24 are mounted on the ends of the axle 23, and the wheels 24 may have rubber tires arranged thereon.

The frame 20 is adapted to be supported by an additional wheel 25 which coacts with the wheels 24 to provide a mobile frame. The wheel 25 is of the caster type so that it can pivot in order to facilitate guiding or turning movement of the barrel truck when a barrel is being transported. For providing a pivotal connection between the wheel 25 and the frame 20, a horizontally disposed brace 26 extends between the body members 21 and 22 and is secured thereto, Figure 4. A U-shaped bracket 27 has its upper portion pivotally connected to the brace 26 by a swivel connection 28, while a short axle 29 extends between the legs of the bracket 27 for supporting the wheel 25.

The body member 21 includes a first elongated portion 30 and a second or upstanding portion 31 which is arranged at right angles with respect to the first portion 30. Similarly, the other body member 22 includes a first portion 32 and a second portion 33 which is arranged at right angles with respect to the first portion 32. It will be noted that the upper or free ends of the second portions 31 and 33 terminate contiguous to each other, Figure 6.

Extending between the front ends of the body members 21 and 22 and secured thereto is a first strap or rigid arcuate member 34 which includes an arcuate intermediate portion 35 that is adapted to engage or support a portion of the barrel B. Extending between the rear ends of the body members 21 and 22 and secured thereto is a second strap 36, and the straps 34 and 36 coact to support the barrel when the barrel is being transported.

An elongated handle 37 has one end pivotally connected to the upper ends of the body members 21 and 22 by a pin 38, Figure 2, the other end of the handle 37 being provided with a finger-engaging portion 38'.

Extending between the second portions 31 and 33 of the body members and spaced below the pin 38 is a locking pin 39. A locking lever 40 is provided with a notch 41, Figure 2, for selective engagement with the locking pin 39. A pair of spaced links 42 have their upper ends pivotally connected to the handle 37 by a pin 43, while the other ends of the links 42 are pivotally connected to the lever 40 by a pin 44. A coil spring 45 has one end connected to the lever 40, while the other end of the coil spring 45 is connected to a pin 46 which extends between the body members 21 and 22. The coil spring 45 tends to maintain the notch 41 and locking pin 39 in their engaged position.

The pin 43 also pivotally connects a pair of spaced brackets 47, Figure 5, to the handle 37, and each of the brackets 47 includes a flat portion 48 for engagement with the end of the barrel B. Secured to each of the brackets 47, as by welding, is an arcuate arm 49. Extending between the upper ends of the arms 49 is a curved bar 50 which is adapted to be moved into engagement with a portion of the barrel for selectively locking the barrel on the truck.

For connecting the bar 50 to the arms 49, a pair of bolts 51 each have one end secured, as by welding, to the bar 50, while the bolts 51 extend through the openings 52 in the arms 49, Figure 7, and nuts 53 are arranged in threaded engagement with the bolts 51 for maintaining the parts in assembled relation. A coil spring 54 is circumposed on each of the bolts 51 for normally urging the bar 50 away from the ends of the arms 49. By properly rotating the nuts 53, the tension in the coil springs 54 can be varied, whereby the position of the bar can be adjusted for different sizes of barrels.

In use, the truck of the present invention is adapted to be used for handling or transporting barrels, such as the barrel B, which may contain any type of material. Thus, to transport the barrel, assume that the barrel B is standing on end, as shown in Figure 1. Then, the operator merely arranges or lifts the truck so that the straps 35 and 36 engage one side of the barrel B. Then the arms 49 are manually pivoted from the position shown in Figure 2 to the position shown in Figure 1, so that the bar 50 engages the opposite side of the barrel B. The locking lever 40 is then moved until its notch 41 engages or receives therein the pin 39, whereby the truck will be locked onto the barrel. After the truck and barrel have been locked together, the parts are in the position shown in Figure 3. Next, the barrel B and truck are tilted so that these members are in the position shown in Figure 3, whereby the wheels 25 and 24 are now supporting the truck and barrel. Then, the handle 37 can be used to manually move the truck and barrel thereon to any desired location and after the barrel has been moved to the desired location, the mechanism can be readily unlocked or disengaged from the barrel.

I claim:

1. In a barrel truck, a frame including a pair of spaced L-shaped body members, an axle extending between the front ends of said body members, a pair of wheels mounted on said axle, a first strap including an arcuate intermediate portion for supporting the barrel secured to the front end of said body members, a caster wheel arranged rearwardly of said front wheels and connected to said frame for supporting the rear portion of the latter, a second barrel-supporting strap secured to the rear ends of said body members, the upper rear ends of said body members terminating contiguous to each other, an elongated handle having one end pivotally connected to the upper rear ends of said body members, and a manually operable locking mechanism operatively connected to said handle for locking said barrel on the truck.

2. In a barrel truck, a frame including a pair of spaced L-shaped body members, an axle extending between the front ends of said body members, a pair of wheels mounted on said axle, a first strap including an arcuate intermediate portion for supporting the barrel secured to the front ends of said body members, a caster wheel arranged rearwardly of said front wheels and connected to said frame for supporting the rear portion of the latter, a second barrel-supporting strap secured to the rear ends of said body member, the upper rear ends of said body members terminating contiguous to each other, an elongated handle having one end pivotally connected to the upper rear ends of said body members, a manually operable locking mechanism operatively connected to said handle for locking said barrel on the truck, and means for pivotally connecting said caster wheel to said frame.

BEN CARTER.

REFERENCES CITED

The following references are of record in the file of this patent:

UNITED STATES PATENTS

| Number | Name | Date |
| --- | --- | --- |
| 1,155,235 | Harvey et al. | Sept. 28, 1915 |
| 1,512,454 | Cade | Oct. 21, 1924 |
| 1,738,096 | Cole | Dec. 3, 1929 |
| 1,769,981 | Allison | July 8, 1930 |
| 2,196,822 | Bissell | Apr. 9, 1940 |
| 2,272,447 | Traxel | Feb. 10, 1942 |
| 2,379,587 | Moore | July 3, 1945 |
| 2,506,471 | Siegal | May 2, 1950 |